INVENTORS
JAMES D. REUTER
EDWIN D. VICKERY
WILLIAM J. EVERETT, JR

BY Sperry and Zoda
ATTORNEYS

INVENTORS
JAMES D. REUTER
EDWIN D. VICKERY
WILLIAM J. EVERETT, JR
BY Sperry and Zoda
ATTORNEYS

United States Patent Office 3,524,613
Patented Aug. 18, 1970

---

3,524,613
FLEXIBLE GLIDING WING
James D. Reuter, Manchester, Edwin D. Vickery, Tolland, and William J. Everett, Jr., Vernon, Conn., assignors to Pioneer Parachute Company, Inc., Manchester, Conn., a corporation of Delaware
Continuation-in-part of application Ser. No. 615,487, Feb. 13, 1967. This application Apr. 8, 1968, Ser. No. 719,313
Int. Cl. B64d 17/02
U.S. Cl. 244—142        12 Claims

ABSTRACT OF THE DISCLOSURE

A self-inflating flexible gliding wing is provided with suspension lines of substantially uniform length in a direction transversely of the wing whereby the wing is given a transversely arched contour. The leading edge of the wing embodies upper and lower members which during flight form a ram air scoop that is substantially closed at the rear along a line spaced from the leading edge so as to maintain the leading edge extended during flight. The space between the upper and lower members is provided with longitudinally extending dividers performing adjacent compartments which preferably communicate with each other to aid in inflation of the wing.

RELATED APPLICATIONS

This application is a continuation in part of copending application, Ser. No. 615,487, filed Feb. 13, 1967 now Pat. No. 3,428,277.

FIELD OF THE INVENTION

This invention relates to self-inflating flexible gliding wings of the type employed in supporting and guiding a load during descent or upon towing of the wing.

BACKGROUND OF THE INVENTION

Numerous forms of gliding wing constructions have been suggested heretofore, as exemplified by U.S. Pat. Nos. 3,131,894 and 3,285,546, and others. However, it is frequently found that the gliding wings of the prior art are relatively unstable in operation and do not always deploy or inflate readily when released from a launching sleeve or pack. Furthermore, unless such flying wings are provided with some means for rendering the leading edge much more rigid or stiff than the remainder of the flying wing, it is found that the leading edge will collapse or be deflected downward by the air stream with the result that such wings cannot fly at efficient angles of attack with respect to the air stream. Prior flying wings also have employed an excessive amount of fabric with the result that the weight of the wing is increased.

SUMMARY OF INVENTION

In accordance with the present invention a lightweight, self-inflating gliding wing is provided wherein suspension lines of substantially uniform length extend downwardly from points spaced apart transversely of the wing to the load to be supported. The wing is thereby given an arcuate or transversely arched contour during flight. As a result the forces exerted on the suspension lines and canopy during deployment and gliding flight of the wing are effectively distributed and downward pull and buckling of the central portion of the wing is prevented.

The self-inflated characteristics of the gliding wing are attained by forming a ram air scoop adjacent the leading edge of the wing whereby the edge is continuously distended during flight and inward buckling of the leading edge under the influence of the air stream is prevented. The angle of attack and the efficiencies of operation of the gliding wing may thereby be increased.

The ram air scoop of the gliding wing is preferably provided with longitudinally extending dividers forming adjacent compartments along the leading edge of the wing and these compartments may be placed in communication through openings in the dividers so as to assure initial and continuous inflation of the air scoop during deployment and flight of the gliding wing.

THE DRAWINGS

Figure 1:
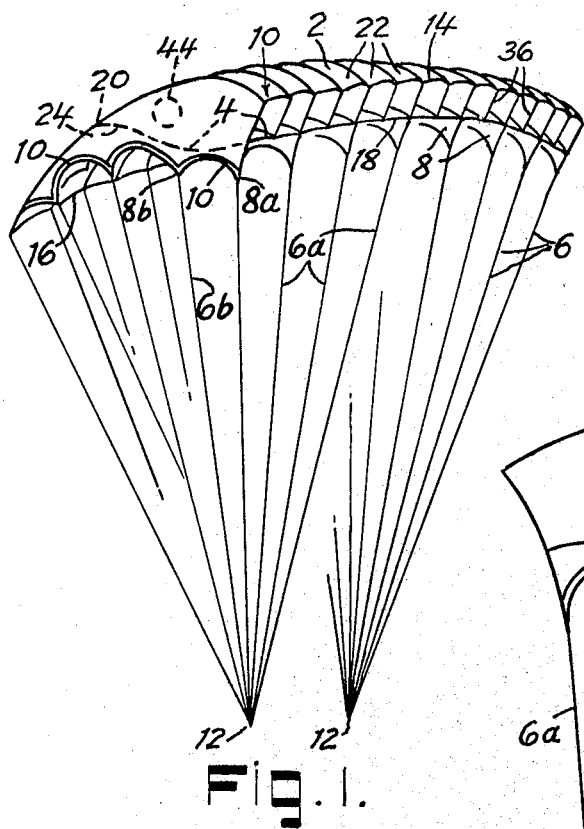
Figure 3:
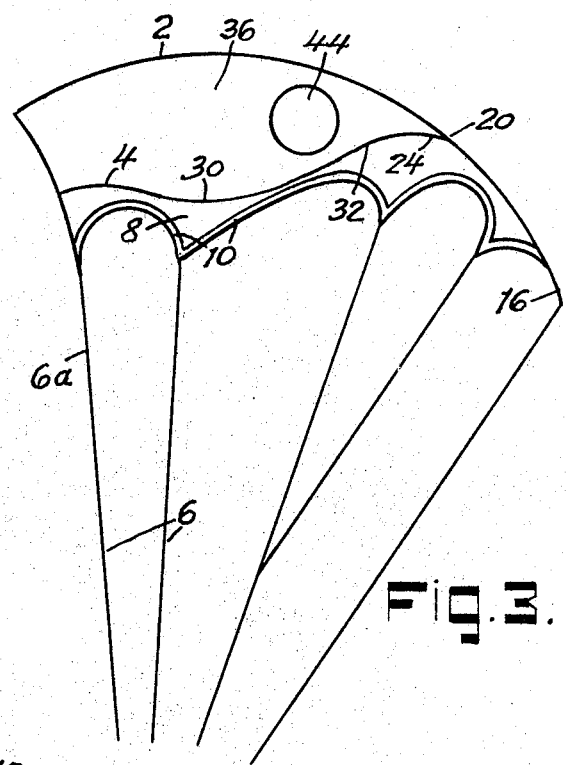
Figure 2:
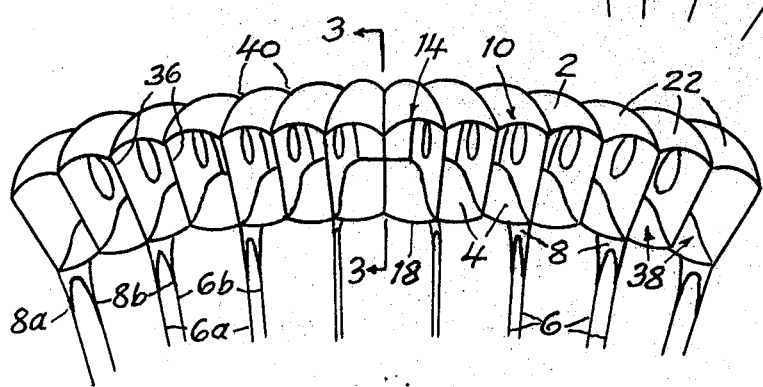
Figure 5:
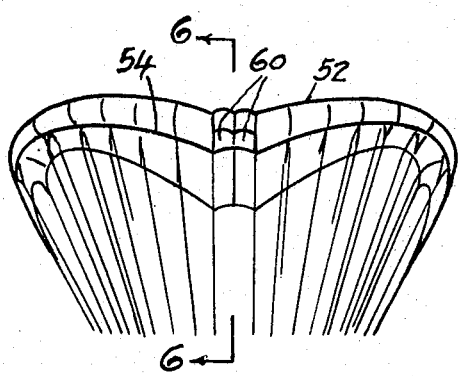
Figure 6:
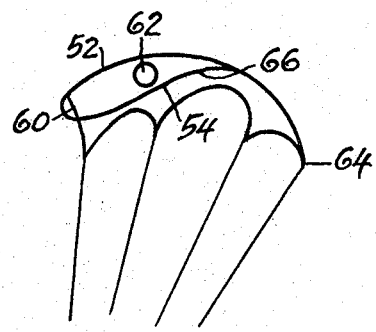
Figure 4:
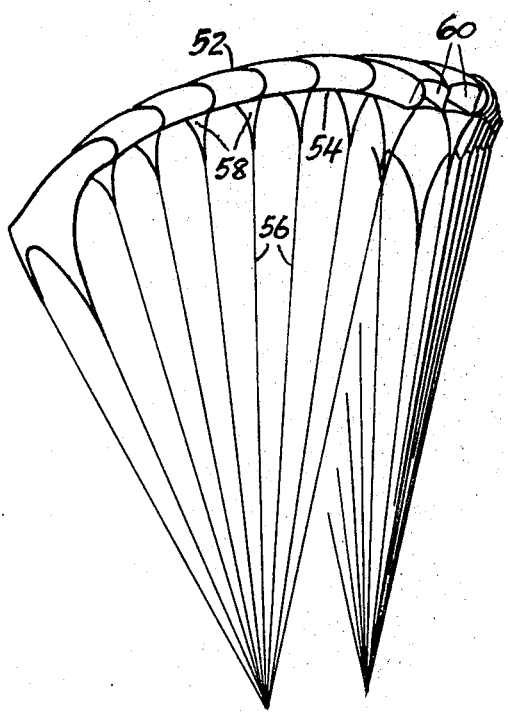
Figure 7:
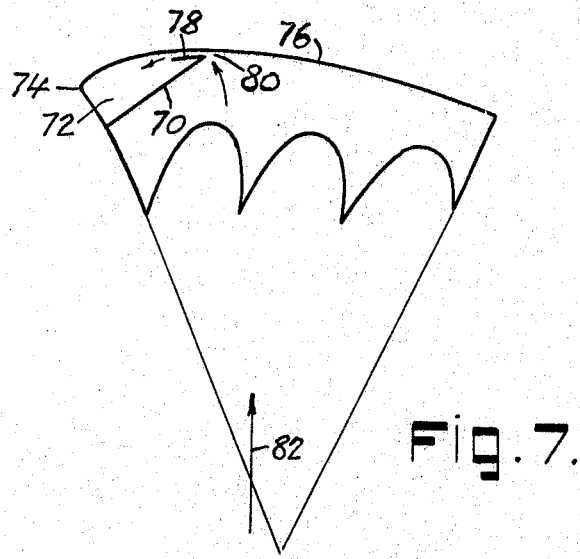
Figure 8:
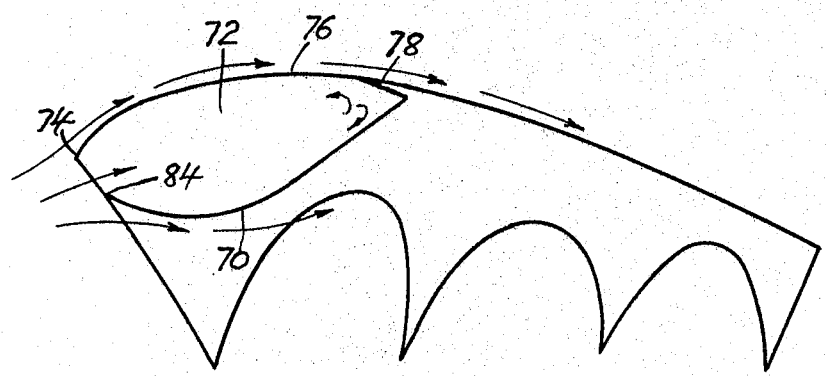

FIG. 1 is a perspective showing one typical form of gliding wing embodying the present invention;
FIG. 2 is a front elevation of the gliding wing of FIG. 1;
FIG. 3 is a longitudinal sectional view through the gliding wing of FIG. 2 taken on the line 3—3 thereof;
FIG. 4 is a perspective illustrating an alternative embodiment of the invention;
FIG. 5 is a front elevation of the gliding wing shown in FIG. 4;
FIG. 6 is a vertical sectional view taken on the line 6—6 of FIG. 5; and
FIGS. 7 and 8 are vertical sectional views through a further alternative form of the invention.

PREFERRED EMBODIMENTS OF THE INVENTION

In that form of the invention chosen for purposes of illustration in FIGS. 1, 2, and 3, the gliding wing is shown as having a generally rectangular or trapezoidal plan form and embodies an upper fabric member or canopy 2, a lower fabric member or bottom 4, and suspension lines 6. Flares or keels 8 extend downwardly below the wing and its bottom member 4 and are secured to the suspension lines 6 so as to be located in planes extending longitudinally of the wing. The suspension lines 6 may be attached to the gliding wing and its canopy 2 but as shown they extend from a load point 12 upward and through the arched or catenary shaped hems 10 along the lower edges of the flares 8 and then back down to the load point 12. The lines 6 will preferably be fixedly sewed or otherwise secured to the hems 10 of the flares 8 so as to prevent slippage or displacement of the lines with respect to the flares and wing. However, in accordance with the present invention all of the suspension lines 6a which extend downwardly from points 8a along the leading edge of the wing, such as the cusps of the foremost flares 8, are of substantially the same length. In a similar way the lines 6b which extend downward from the cusps or points 8b located on a transversely extending line spaced rearwardly from the leading edge of the wing are preferably of substantially the same length.

In this way the canopy 1 of the gliding wing is given an arcuate or arched contour in a direction transversely of the wing. At the same time the wing may also be longitudinally curved or arched to impart a predetermined longitudinal cross section thereto by varying the length of the longitudinally spaced suspension lines 6a, 6b, etc. With this construction the load and forces applied to the suspension lines and wing are distributed more uniformly throughout the wing. In particular upon removal from a pack or launching sleeve the opposite sides or wing tips of the canopy are subjected to the same pull from the suspension lines as the central portion of the canopy by reason of the uniformity in length of the suspension lines. The danger of downward buckling of the wing at the center to present a V-shaped configuration on deployment is thereby eliminated. Moreover, after deployment of the canopy the load is so distributed that subsequent buckling of the wing upon oscillation or on change in the direction and velocity of the wind, is reduced to a minimum.

As shown in the drawing the canopy 2 presents a leading edge 14 and has a rearward and downward inclined trailing edge 16. The lower member 4 of the wing has a leading edge 18 but is secured at its rear edge to the upper member or canopy 2 along a transversely extending line 20 located near the mid-portion of the wing. When inflated, the leading edges 14 and 18 of the canopy and lower members 4 respectively, are spaced apart to form a ram air scoop which serves to hold the wing extended transversely against the action of the load applied to the suspension lines 6. The forward portion 22 of the canopy is preferably curved downward somewhat as shown so that the leading edge 14 thereof is inclined toward the leading edge 18 of the lower member. As a result an area of negative or low pressure air is established above the forward portion 22 of the canopy to hold the ram air scoop open and to maintain the leading edge of the wing distended at higher and more efficient angles of attack than would be possible with inflated wings of the prior art.

The lower member or bottom 4 of the gliding wing is less extensive in area than the canopy 2. As shown the rear edge 24 of the lower member 4 is located near the mid-portion of the canopy and extends along a transverse line 20. The edge 24 of the bottom member may be secured to the canopy 2 throughout the width of the canopy so as to close the rear end of the ram air scoop formed by cooperation of the canopy 2 and member 4. However, for some purposes and in some applications of the gliding wing the rear edge 24 may merely be tacked to the canopy at spaced points or otherwise formed to present a restricted opening between the edge 24 and the lower surface of the canopy 2 permitting limited air flow from the rear of the air scoop into the space beneath the canopy 2.

The lower member or bottom 4 of the air scoop may be fabricated sufficiently long in a direction longitudinally of the gliding wing whereby the air scoop may present a downwardly swelling lower surface at a point located between the leading edge 14 and the rear edge 24 thereof as shown at 30. The bottom member 4 thus presents a lower contoured surface which slopes upwardly and rearwardly at 32 to the rear edge 24. In this way the canopy and lower member 4 combine to present cooperating surfaces of efficient aerodynamic configuration. Moreover, the upper surface of the canopy 2 is smooth and rounded and extends downward to the trailing edge 16.

It is very desirable when securing of the rear edge 24 of the lower member 4 to the lower surface of the canopy 2 at the mid-portion thereof, to avoid the formation of a transverse seam or depression in the upper surface of the canopy which would adversely effect the boundary layer of air flowing over the upper surface of the wing. This may be readily accomplished by providing a plurality of longitudinally extending fabric dividers 36 located in vertical planes between the canopy 2 and bottom member 4 so as to establish a plurality of adjacent compartments or cells 38 within the ram air scoop at the leading edge of the gliding wing. These dividers may be so secured to the upper and lower members as to establish longitudinally extending seams and depressions as shown at 40 while avoiding the creation of any transverse seams or depresions in the upper surface of the canopy.

The dividers employed in the practice of the present invention are preferably provided with openings therein near the rear of the ram air scoop as shown at 44. Air may then flow laterally within the air scoop from one compartment 38 to another so as to equalize the pressures therein, As a result, initial and complete inflation of the ram air scoop on deployment of the wing is assured. Moreover, the pressure of the air entering the air scoop will be automatically equalized throughout the width of the gliding wing so as to hold it distended during flight and as the direction and angle of attack of the wing with respect to the air stream varies.

While the form of the invention illustrated in FIGS. 1, 2, and 3 and described above is preferred for many uses and applications of the invention, the gliding wing may be constructed as illustrated in FIGS. 4, 5 and 6, if desired. As there shown, the upper members or canopy 52 is more nearly triangular in plan form and the lower member or bottom 54 is connected to the suspension lines 56 by flares 58 or the like which are of greater area than those illustrated in FIGS. 1, 2 and 3 of the drawings.

Further, as shown in FIGS. 4 and 5 the canopy 52 and bottom 54 are secured together at the leading edge thereof throughout the greater part of the width of the wing, leaving only two or a limited number of ram air scoop openings 60 in the leading edge of the wing. The wing will nevertheless be inflated and fully expanded by flow of air through the openings 62 in the vertical dividers of the wing and from one compartment therein to another. Moreover the rear edge 66 of the bottom 54 may be spaced from the lower surface of the canopy 52 as shown at 66 to permit controlled discharge of air from the compartments in the wing to the area beneath the rear portion of the wing.

In each of the forms of the invention shown and described it is desirable to use cloth or flexible material which is relatively impervious to air in forming the canopy of the wing. Similarly, the lower member or bottom 4 of the ram air scoop may be formed of relatively nonporous material, if desired. On the other hand, the dividers which extend between the canopy and bottom member to form the compartments within the wing may be formed of fabric, strips or other material which will permit relatively free flow of air from one compartment to another. The lower member or bottom 4 of the air scoop may be more porous than the canopy 2 since the air passing through the bottom member will enter the space beneath the gliding wing to aid in sustaining the same. Furthermore, when the rear edge 24 of the lower member 4 is not secured to the canopy 2 or is only attached thereto by means of the dividers 36 the air issuing from the rear of the ram air scoop or the compartments thereof will be directed along the lower surface of the canopy toward the trailing edge 16 thereof.

Further, as shown in the alternative construction of FIGS. 7 and 8, the lower member or bottom 70 of the air scoop 72 adjacent the leading edge 74 of the canopy 76 of the gliding wing is provided with a forwardly turned flap 78 located adjacent the rear edge of the bottom 70. The flap 78 is not attached to the canopy but is instead movable toward and away from the lower surface of the canopy 76. When flap 78 is spaced from the canopy 76 as shown in FIG. 7, it serves to present a space or opening 80 through which air may flow forwardly from beneath the canopy into the air scoop 72. Therefore when the gliding wing is first released from a pack and is descending in an essentially vertical direction, the air beneath the canopy will impinge against the lower surface of canopy 78 as represented by the arrow 82. At such time the pressure of the air against the canopy will cause it to flow outwardly toward the edges of the canopy and a portion of such air will flow forward through the opening 80 between the flap 78 and the canopy 76 and into the air scoop 72. In this way inflation of the air scoop 72 will be hastened and assured even while the gliding wing is descending in a vertical direction and prior to complete deployment thereof.

Thereafter when the gliding wing is fully inflated and inclined as shown in FIGS. 1 and 2 it will start to move forwardly so that air will enter the opening or inlet at the front of the air scoop, formed by the air space between the leading edge 74 of the canopy 76 and the leading edge 84 of the bottom member 70 of the air scoop. Such inward and rearward flow of air into the air scoop 72 will cause the loose closure flap 78 to be forced upward against the lower surface of the canopy 76 to close the opening 80 and limit or prevent continued flow of air rearwardly through the air scoop as indicated by the arrows in FIG. 8. The flap 78 therefore functions as a one way valve permitting air to flow forwardly through opening 80 into the air scoop 72 during the initial stages of descent when the gliding wing is moving vertically. The valve member or flap 78 then serves to promote inflation of the air scoop along the leading edge of the gliding wing. Subsequently, when the wing is fully deployed and travelling forward the flap 78 is closed by the air entering the front of the air scoop so as to prevent air from continuing to flow rearwardly through the opening 80 as long as the gliding wing is traveling in a forward direction.

The constructions as shown in FIGS. 7 and 8 further renders it possible to reduce the cross-sectional area of the opening at the front of the air scoop between the leading edges 74 and 84. The bottom member 70 of the air scoop then can be given a more curved or streamlined contour, having improved aerodynamic characteristics which reduce the drag imposed by the air scoop as the gliding wing moves forward.

The flares 8 of the gliding wing are preferably located in substantially verticaly planes extending longitudinally of the wing. However, when the wing has a triangular or other plan form the flares may be inclined with respect to each other to aid in guiding or controlling the operation of the gliding wing during flight.

The suspensoin lines may be connected to the canopy and lower member of the wing, or to the flares, in any suitable or preferred manner. Nevertheless, it is generally preferable to arrange the suspension lines so that those lines which are spaced apart transversely of the wing are of substantially the same length whereas suspension lines spaced apart longitudinally of the wing may vary considerably in length. In this way the gliding wing may be given a predetermined contour which will render it most suitable for the conditions of flight it may encounter.

Accordingly, it should be understood that the particular embodiment of the invention shown in the drawings and described above are intended to be illustrative only and are not intended to limit the scope of the invention.

I claim:
1. A flexible and inflatable gliding wing comprising upper and lower flexible members which are connected to one another at points between the leading and trailing edges of the wing, the leading edges of said members, upon inflation of the wing, being spaced apart vertically to permit the entry of air into the space therebetween, suspension lines connected to said wing and extending downward from the wing in converging relation to at least one point of attachment to a load, said suspension lines being arranged in longitudinally spaced and transversely extending rows with the suspension lines in each transversely extending row being substantially equal in length and serving, during flight, to impart to said wing a contour which is transversely arched with the center of curvature of said arched contour being the point of attachment of said suspension lines to a load.

2. A gliding wing as defined in claim 1 wherein said upper and lower members cooperate to define a ram air scoop which faces forwardly of said wing and presents a closed rear end near the mid-portion of the wing.

3. A gliding wing as defined in claim 1 wherein the leading edge of the upper member is inclined downwardly toward the lower member of said wing.

4. A gliding wing as defined in claim 1 wherein a plurality of transversely spaced and vertically positioned dividers extend longitudinally of said wing between said upper and lower members and serve to divide the space therebetween into compartments.

5. A gliding wing as defined in claim 4 wherein said dividers serve to impart an airfoil contour to said upper and lower members of the wing in a direction longitudinally thereof.

6. A gliding wing as defined in claim 4 wherein at least a portion of said vertically positioned dividers are provided with openings therein through which air may flow transversely of the wing from one of said compartments to another.

7. A gliding wing as defined in claim 4 wherein said dividers extend throughout substantially the full length of the space between the upper and lower members.

8. A gliding wing as defined in claim 1 wherein said upper and lower members are spaced apart upon inflation through out a portion only of the area of the upper member near the leading edge thereof.

9. A gliding wing as defined in claim 1 wherein the lower member is located beneath the front portion only of the upper member.

10. A gliding wing as defined in claim 1 wherein said lower member is located beneath the front portion only of said upper member and said members are secured together at points along a line extending transversely of the wing approximately midway between the leading and trailing edges of the upper member, there being vertically positioned dividers spaced transversely and extending longitudinally of said wing between the upper and lower members to form compartments within the space between said members, the leading edge of said upper member extending downward toward the leading edge of the lower member upon inflation, the trailing edge of said upper member extending downward below the lower member at the rear thereof, and said dividers having openings therein through which air may flow transversely from one compartment to another within the space between said members.

11. A gliding wing as defined in claim 10 wherein a portion only of said compartments open forwardly of the wing.

12. A gliding wing as defined in claim 2 wherein said ram air scoops are provided with openings at the rear thereof through which air may pass between the space beneath said gliding wing and said scoops.

References Cited

UNITED STATES PATENTS

| | | | |
|---|---|---|---|
| 2,447,187 | 8/1948 | Kunkler | 244—142 |
| 2,759,694 | 8/1956 | Lemoigne | 244—145 |
| 3,131,894 | 5/1964 | Jalbert | 244—145 |
| 3,285,546 | 11/1966 | Jalbert | 244—145 |
| 3,428,277 | 2/1969 | Everett | 244—142 |

MILTON BUCHLER, Primary Examiner

J. E. PITTENGER, Assistant Examiner